United States Patent [19]

Bongaerts et al.

[11] Patent Number: 5,626,772
[45] Date of Patent: May 6, 1997

[54] PLASMA ADDRESSED LIQUID CRYSTAL DISPLAY WITH ETCHED PLASMA CHANNELS

[75] Inventors: Petrus F. G. Bongaerts, Waalre; Jacob Bruinink, Eindhoven; Adrianus L. J. Burgmans, Eindhoven; Henri R. J. R. Van Helleputte, Eindhoven, all of Netherlands; Babar A. Khan, Ossining, N.Y.; Karel E. Kuijk, Dommelen, Netherlands; Thomas S. Buzak; Kevin J. Ilcisin, both of Beaverton, Oreg.; Paul C. Martin, Vancouver, Wash.

[73] Assignee: Philips Electronics North America Corporation, New York, N.Y.

[21] Appl. No.: 407,536

[22] Filed: Mar. 20, 1995

[51] Int. Cl.⁶ .......................................... B44C 1/22
[52] U.S. Cl. .................. 216/24; 216/33; 216/39; 349/32; 428/163; 428/164
[58] Field of Search .................. 216/23, 24, 33, 216/39, 56, 67; 359/58, 59, 62, 79, 87; 428/1, 161, 162, 163, 164, 167, 209

[56] References Cited

U.S. PATENT DOCUMENTS

| | | | |
|---|---|---|---|
| 4,896,149 | 1/1990 | Buzak et al. | 340/794 |
| 5,077,553 | 12/1991 | Buzak | 340/794 |
| 5,100,498 | 3/1992 | Takeuchi et al. | 216/56 |
| 5,214,521 | 5/1993 | Kwon et al. | 359/54 |
| 5,272,472 | 12/1993 | Buzak | 345/60 |
| 5,276,384 | 1/1994 | Martin | 313/582 |

OTHER PUBLICATIONS

Buzak et al, "A 16-Inch Full Color Plasma Addressed Liquid Crystal Display", Digest of Tech. Papers, 1993 SID Int. Symp., Soc. for Info. Disp. pp. 883–886.

*Primary Examiner*—William Powell
*Attorney, Agent, or Firm*—John C. Fox

[57] ABSTRACT

A flat display device preferably of the PALC type in which a fragile micro-sheet covering the plasma channels is replaced by a more robust plate having etched spaced elongated cavities configured in such a way that the top portions of the plate between side walls of each cavity defining a channel and facing the bottom plate are substantially flat. Preferably, the thickness of the glass top plate separating each plasma discharge from an electro-optic pixel is made substantially uniformly thin while the side walls reinforce and greatly increase the strength of the plate making it less prone to breakage during assembly of a display panel. Preferably, the glass plate is etched by means of a plasma etching process.

17 Claims, 2 Drawing Sheets

PLASMA ADDRESSED LIQUID CRYSTAL DISPLAY WITH ETCHED PLASMA CHANNELS

RELATED APPLICATIONS

1) Pending application, Ser. No. 08/361,078, filed Dec. 21, 1994 (Attorney's docket no. PHA 60,086); and 2) Allowed application, Ser. No. 08/413,052, filed Mar. 29, 1995 (Attorney's docket no. PHA 60,092).

BACKGROUND OF INVENTION

This invention relates to plasma-addressed liquid crystal display panels commonly referred to as "PALC" display devices. These devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. patents and publication, the contents of which are hereby incorporated by reference: U.S. Pat. Nos. 4,896,149; 5,077,553; 5,272,472; 5,276,384; and Buzak et al., "A 16-Inch Full Color Plasma Addressed Liquid Crystal Display", Digest of Tech. Papers, 1993 SID Int. Symp., Soc. for Info. Displ. pp. 883–886.

A cross-section of the PALC display described in the 1993 SID Digest is shown in FIG. 2. The thin dielectric sheet, called from time-to-time herein the "micro-sheet", can be given a thickness in the range of 30–50 μm. This makes the sheet rather fragile and special precautions have to be taken in the fabrication process of the panels. Breakage of the micro-sheet is the main yield limiting factor.

In order to make the cover sheet of the plasma channel part more rigid, U.S. Pat. No. 5,214,521 proposed a construction in which the electrodes are deposited on a flat bottom plate while the top plate is etched back to form channels shaped as hemi-cylinders—the inverse of that shown in FIG. 2—in such a way that the remaining glass at the top of the channels is thin enough to allow addressing of the adjacent LC material.

However, due to the circular curvature of the top plate, between the plasma discharge and the LC material, the glass thickness and thus the voltage drop over the LC material varies significantly for each pixel. In practical situations, this reduces the number of gray levels of the display.

SUMMARY OF INVENTION

An object of the invention is an improved channel plate for a flat display device.

A further object of the invention is an improved plasma-addressed display device.

Another object of the invention is a PALC display device having a more robust construction.

A further object of the invention is a PALC display device in which the fragile micro-sheet covering the plasma channels is replaced by a more robust plate.

In accordance with a first aspect of the invention, a channel plate for a flat display device-comprises a dielectric substrate and a thin dielectric channelled sheet-like member over the substrate, the thin dielectric sheet-like member comprising for each channel an etched cavity having a thin top wall with a substantially flat inner surface flanked by side walls substantially transverse to the top wall.

In accordance with a first embodiment of the invention, the dielectric substrate, referred to herein also from time-to-time as a bottom plate, is flat and is covered with a top plate, preferably of glass, having etched spaced elongated cavities configured in such a way that the top portions of the plate between side walls of each cavity defining a channel and facing the bottom plate are substantially flat. In a plasma-addressed display device, preferably the thickness of the glass top plate separating each plasma discharge from an electro-optical pixel is made substantially uniformly thin while the side walls reinforce and greatly increase the strength of the plate making it less prone to breakage during assembly of a display panel.

In accordance with a second embodiment of the invention, both the bottom plate and top plate are of preferably of glass etched and configured in such a way that the plate portions defining a channel and facing one another are substantially flat. In the same way as with the first embodiment, the thickness of the glass separating each plasma discharge from the electro-optic layer can be made substantially uniform while greatly increasing the strength of the plate and making it less prone to breakage during assembly of a display panel.

In these embodiments, the electrodes may be deposited on the bottom plate, or on the sidewalls of the top plate or bottom plate.

In accordance with another aspect of the invention, the glass plate or plates are etched by means of a plasma etching process, which has the advantage that vertical side walls are easily obtained.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
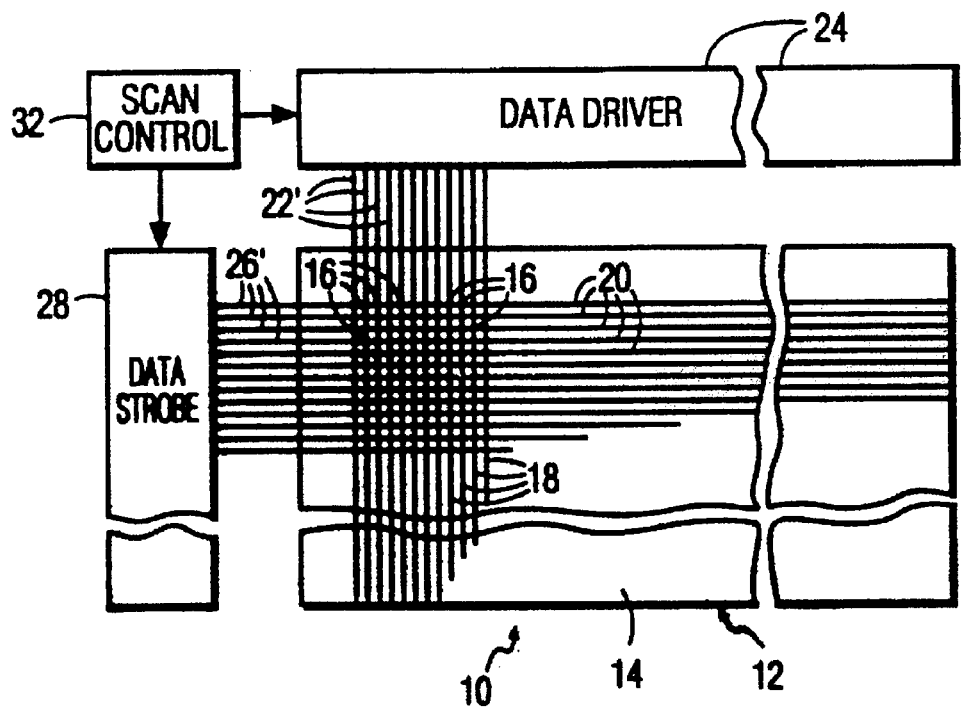
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36. Skilled persons will appreciate that certain systems, such as a reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion as had been described. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
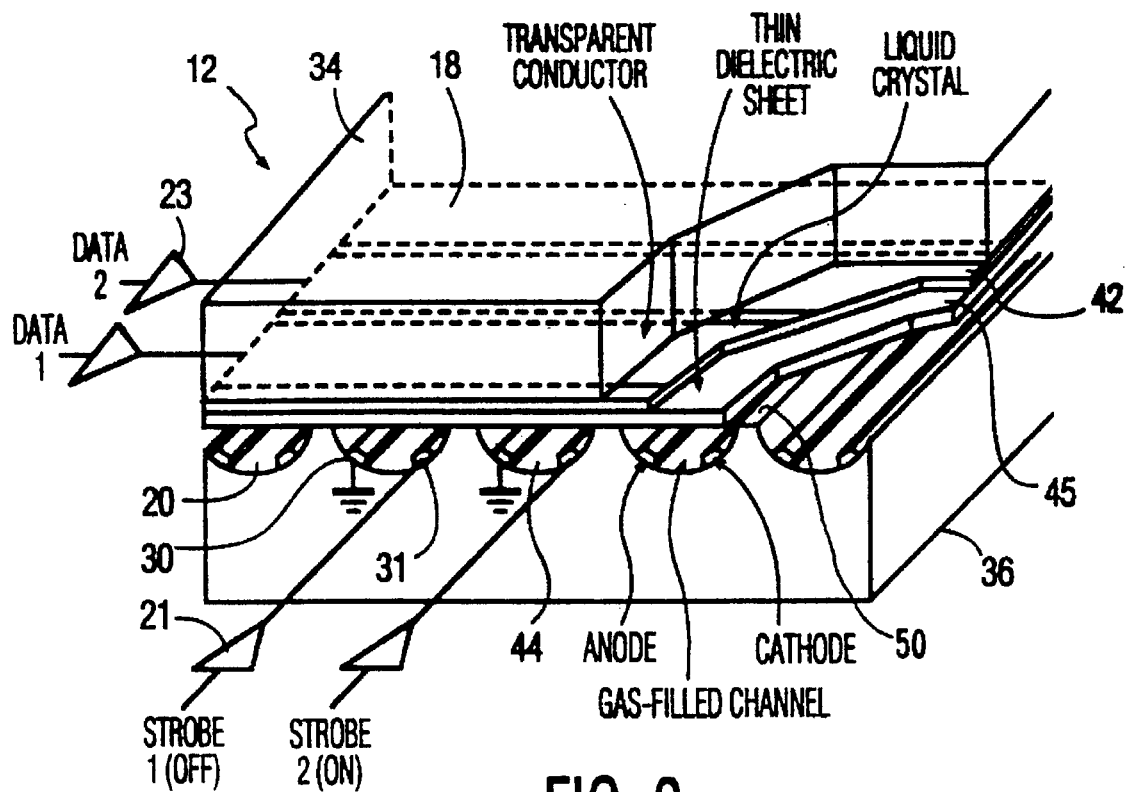
FIG. 2 is a perspective view of part of a conventional PALC display device.

FIG. 2 illustrates the PALC version of such a flat display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

Fabrication of a PALC device is typically done as described in the 1993 SID digest paper by providing first and second substrates 34, 36 with the first substrate 34 comprising a glass panel on which is vapor-deposited the ITO column electrodes 18, followed by color filter processing over the ITO electrodes to produce the RGB stripes (not shown), followed by the black surround processing and liquid crystal alignment processing. The second substrate 36, also a glass panel, is masked and etched to form the channels 20, following which the plasma electrode material is deposited and masked and etched to form the anode 30 and cathode 31 electrodes. A thin dielectric glass microsheet 45 is then sealed across the channel ridges 50 to seal off the channels 20, which are then exhausted, back-filled with a low-pressure ionizable gas such as helium and/or neon and optionally with a small percentage of argon and sealed off. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

Figure 3:
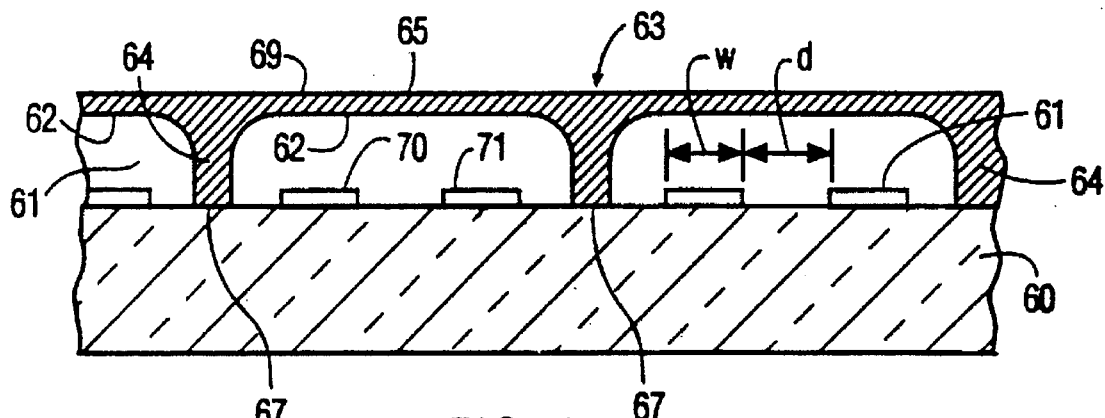
FIG. 3 is a cross-section of a part of a channel plate of one form of a channel plate according to the invention of a PALC color display.

FIG. 3 is a cross-section of one form of channel plate in accordance with the invention for one form of liquid crystal display panel in accordance with the invention. A thick flat glass bottom plate 60 forms a dielectric substrate for the plasma channels 61. Over the bottom plate 60 is sealed a top plate 63 in the form of a thin dielectric sheet-like channelled member, for example, of glass, which has been etched to form adjacent cavities 62 each flanked by side walls 64 and a substantially flat top wall 65 facing the bottom plate 60. The top plate 63 may be sealed along the ridges 67 of its side walls 64 to the bottom plate in any known manner, for example, by means of fused glass frit to form the sealed plasma channels 61. Alternatively, the periphery of the top plate 63 may be sealed to the periphery of the bottom plate 60 to seal off the structure, the individual channels not being required to be sealed off as a common gas is used for all the channels. The outer surface 69 of the top part 65 interfaces with the LC layer (not shown). Cathode 70 and anode 71 electrodes are deposited in a conventional manner on the inside surface of the bottom plate 60.

Figure 4:
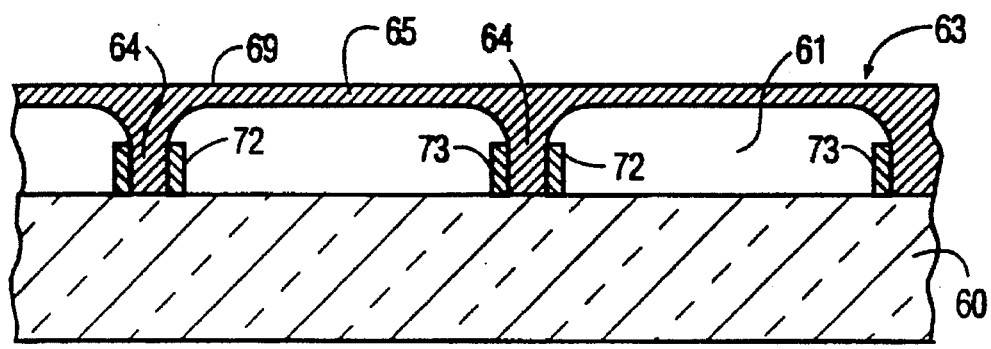
FIG. 4 is a view similar to FIG. 3 of another form of a channel plate of a PALC display device according to the invention.

FIG. 4 shows a modification in which the electrodes 72, 73 are formed on the inside surfaces of the side walls 64. The construction is otherwise the same.

Figure 5:
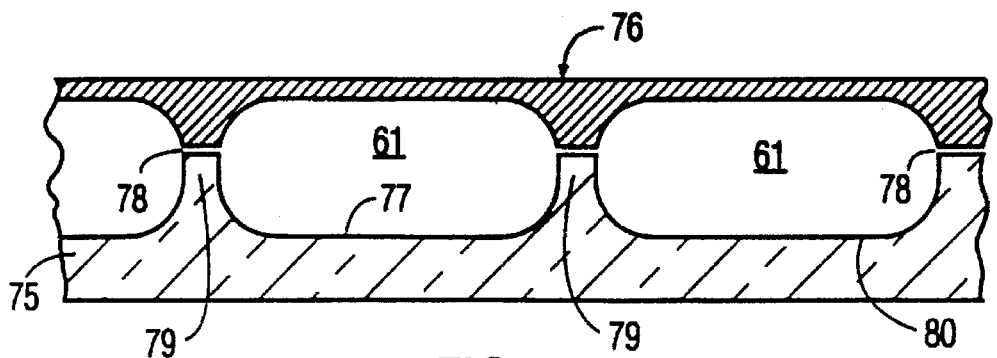
FIG. 5 is a view similar to FIG. 3 of still another form of a channel plate of a PALC display device according to the invention.

FIG. 5 shows a further modification in which the flat bottom plate is replaced by an etched glass plate 75 configured with etched cavities 77 similar to that of the top plate 76, except that the etched bottom plate 75, forming the supporting substrate, can be much thicker. Also, for the same channel depth, the side walls 78 of the top plate 76 and those 79 of the bottom plate 75, together, can be made substantially equal to the side walls 64 of the FIG. 3 embodiment. Preferably, the etched sides of two halves 76, 75 forming the channels 61 are mirror images of each other. In the case of the FIG. 5 embodiment, the electrodes, not shown, can be placed on the bottom substantially flat surfaces 80 inside each channel, thus extending in substantially the same plane as in the FIG. 3 embodiment, or on the side walls 79 thus extending substantially vertically, facing one another, as in the FIG. 4 embodiment.

It will be understood that it is the thickness of the top part 65 of the top plate 63 that preferably is as uniform as possible so that the applied column voltage is substantially equally effective over the whole pixel aperture, and it is also desirable that the top part 65 have the smallest thickness dimension so as to minimize the voltage drop across it. The side walls 64, 78, allow the top part 65 thickness to be minimized while reinforcing the plate so that it is more robust and less prone to breakage during fabrication of the panel.

All of the methods described in the referenced patents and publication will be suitable for making the channels and electrodes for the panel of the invention. Conventional wet etching techniques for glass can be used with the etch mask having wide apertures overlying the substantially flat bottom parts of the plates and with each mask edge located approximately a distance from each side wall substantially equal to the depth of the trough-like channel 61 produced. Preferably the top plate 63,76 initially has a thickness such that, after the etching of the channels is complete, the thickness of the top wall 65 is in the range of 5–50 µm. Alternatively, the outer surface 69 of the top wall 65 can be uniformly etched down to the desired thickness.

A preferred etching technique, described below, is based on techniques known from the fabrication of integrated circuits (ICs) in the semiconductor technology.

A glass panel is covered with a conventional glass-etch mask material and patterned in the usual way by a lithography step. The etch mask will be used as a mask for etching the cavities. The etch control is expected to be quite good, because of the large mask dimensions and continuous refreshment of the reactant gases. The etch time can be changed by changing the process parameters like temperature, bias voltage and pressure.

From IC fabrication techniques, etch selectivities of greater than 10:1 are known for etching $SiO_2$, the primary constituent of the glass. So with a relatively thin etch mask of, for example, Mo, Cr, or $Al_2O_3$, it is possible to etch trenches into glass. It is known that sometimes, depending on etch conditions, the etch rate near the corners of the channel may be higher compared to the middle part of the channel, but for the fabrication of PALC channels, this will cause no harm. IC etch processes are typically optimized, for example, for steep sidewalls, and not for speed which is more important for PALC display panels when mass produced. By changing process temperature and pressure, it is possible to increase the etch rate drastically.

Etch rates and selectivities compared to $SiO_2$ for several etch mask materials are listed below:

| Etch mask | Cr | $Al_2O_3$ |
| --- | --- | --- |
| Etch rate nm/min of mask | unknown | 0.027 |
| Etch rate nm/min of SiO2 | 20 app. | 1.4 |
| selectivity mask:SiO2 | >25 | 50 |
| etch gas | $CF_4$, $CHF_3$, Ar | HCl |

The electrode material, typically of a multi-layer of Cr—Cu—Cr, can be applied to the etched cavities by conventional sputter deposition. It will cover the entire bottom as well as the side walls. After the electrode material is deposited, it can be etched back isotropically leaving the separated cathode and anode electrodes 70, 71 on the side walls as is described in more detail in the second referenced related application (5604-0382), whose contents are herein incorporated by reference. The selectivity difference of the metal and glass substrate should prevent the glass from etching. Alternatively, the desired electrode material can be masked and subjected to a normal etching technique to remove the unmasked regions.

In accordance with another aspect of the invention, a preferred etching technique is plasma or dry etching of the glass substrate, sometimes also referred to as reactive ion etching (RIE). The advantage of this technique is that nearly rectangular side walls can be achieved suitable for receiving the electrodes while forming a uniformly thin wall to be located opposite the LC layer. It offers the further advantage that selective plasma etching of the electrodes can then be carried out allowing selective removal of any electrode portions on the bottom part without requiring masking of the aluminum.

Most plasma etching processes suitable for etching $SiO_2$ can be used. A preferred plasma etching process is as follows. After masking of the glass surface—when RIE is used, then the etch mask openings can be chosen to match the full width between the side walls of the substantially flat glass bottom part—the glass part is placed in a conventional RIE reactor and etched under standard conditions using gasses such as $CF_4+O_2$ or $CHF_3+O_2$ and similar fluorine, chlorine or bromine compounds, with the $O_2$ typically constituting 5–30% of the gas mixture. Etch rates of ½–1 µm can be achieved. The apparatus described in U.S. Pat. No. 5,306,379 can also be used for etching the trough-like channels 61 of the plasma channel plate 60 as well as the etch gasses and other conditions described in that patent.

Fabrication of the channel plate by plasma etching results in glass channels with nearly vertical side walls. The electrode material, for example, of Cr—Cu—Cr, can then be sputter deposited over the bottom and side walls, masked, and all but the desired electrode shapes removed by etching. Alternatively, as described in the second referenced related application, the undesired material can be selectively removed by anisotropic etching.

The advantages of plasma etching of the glass channels are that nearly vertical side walls can be obtained, and there is less pollution effects as compared to wet etching.

The invention is generally applicable to all kinds of flat displays, and in particular to displays of the plasma-addressed type, especially PALC displays that typically have a small channel pitch for use in computer monitors, workstations or TV applications. Such displays will have channel dimensions typically within the ranges stated below. In general, with a desired channel pitch p as the given, and b representing the width of the ridges formed by the side walls 64, 78 between adjacent channels 61, and h representing the height of the channel, the preferred ranges of h and b for channels with vertical side walls, and with the electrodes on the side walls as in FIG. 4, are as follows:

(i) $0.03\ p \leq b \leq 0.1\ p$ (ii) $0.28\ p \leq h \leq 0.34\ p$

When b is chosen in the range indicated, the ridge width is kept small making for a larger aperture; when h is in the range indicated, then a shorter etch time is needed without sacrificing a stable discharge.

When the electrodes are on the bottom flat sides as in FIG. 3, then the lateral width w of the electrodes and the lateral spacing d in a channel between the adjacent electrode edges are preferably as follows:

(iii) $0.1\ p \leq w \leq 0.25\ p$ (iv) $0.6\ p \leq d \leq 0.75\ p$

When w and d are chosen in the ranges indicated, it makes for a larger aperture.

Several preferred examples for the FIG. 3 embodiment are (all values are in μm):

(1) for p=312, b=20, d=215, h=90, w=78;

(2) for p=500, b=50, d=304, h=160, w=50.

The wall 65 thickness over at least 60% of the channel width preferably is uniform within a tolerance of ±1% over the short range and within ±5% over the long range (approximately the length of the channel or the size of the panel), as a percentage of the height h. The surface may be optically flat and change smoothly as a result of the wet or dry etching process for etching the channels in the glass substrate.

It will be appreciated that the drawing figures are not to scale and in particular the channel widths have been exaggerated to show the electrodes.

Still further, while the channels in the substrate are typically straight, the invention is not limited to such a configuration and other channel shapes, such as a meandering shape, are also possible within the scope of the invention.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A channel plate for a flat display comprising elongated channels in a dielectric member, characterized in that:

a) the dielectric member comprises a dielectric substrate and a thin dielectric sheet member with etched channels, b) the channels being closed off by the substrate, c) the thin dielectric sheet member comprising for each channel an etched cavity having a thin top wall with a substantially flat inner surface flanked by side walls substantially transverse to said top wall.

2. A channel plate as claimed in claim 1, wherein the sheet is constituted of glass.

3. A channel plate for a flat display comprising elongated channels in a dielectric member, characterized in that:

a) the dielectric member comprises a dielectric substrate with channels, and b) a thin dielectric sheet, c) the channels being closed off by the thin dielectric sheet, d) the thin dielectric sheet comprising for each channel an etched cavity having a thin top wall with a substantially flat inner surface flanked by side walls substantially transverse to said top wall.

4. A plasma-addressed display device comprising a layer of electro-optical material between a first substrate comprising data electrodes and a channel plate comprising elongated plasma channels in a dielectric member, said plasma channels each comprising spaced elongated cathode and anode plasma electrodes and an ionizable gas filling, characterized in that:

a) the dielectric member comprises a dielectric substrate and a thin dielectric sheet with etched channels, b) the channels being closed off by the substrate, c) the thin dielectric sheet comprising for each channel an etched cavity having a thin top wall with a substantially flat inner surface flanked by side walls substantially transverse to said top wall.

5. A plasma-addressed display device comprising a layer of electro-optical material between a first substrate comprising data electrodes and a channel plate comprising elongated plasma channels in a dielectric member, said plasma channels each comprising spaced elongated cathode and anode plasma electrodes and an ionizable gas filling, characterized in that:

a) the dielectric member comprises a dielectric substrate with channels, and b) a thin dielectric sheet, c) the channels being closed off by the thin dielectric sheet, d) the thin dielectric sheet comprising for each channel an etched cavity having a thin top wall with a substantially flat inner surface flanked by side walls substantially transverse to said top wall.

6. A plasma-addressed electro-optic display device comprising a layer of electro-optic material, data electrodes coupled to the electro-optic layer and adapted to receive data voltages for activating portions of the electro-optic layer, a plurality of elongated plasma channels extending generally transverse to the data electrodes for selectively switching on said electro-optic portions, a thin dielectric sheet closing off the plasma channels on the side facing the data electrodes and between the plasma channels and the electro-optic layer, said plasma channels each comprising spaced elongated cathode and anode plasma electrodes and an ionizable gas filling, characterized in that the thin dielectric sheet comprises over each channel an etched cavity forming a thin top wall flanked by substantially vertical side walls with the thin top wall having a substantially flat inner surface.

7. The device of claim 6, characterized in that the thin top wall extending over each of the channels has a substantially uniform thickness.

8. The device of claim 6, characterized in that the dielectric sheet comprises glass and the etched like cavities forming the side walls.

9. The device of claim 7, characterized in that the dielectric sheet is supported on a glass substrate.

10. The device of claim 9, characterized in that the glass substrate comprises a flat glass plate.

11. The device of claim 10, characterized in that spaced electrodes are provided on the flat glass plate.

12. The device of claim 10, characterized in that spaced electrodes are provided on the flanking side walls.

13. The device of claim 9, characterized in that the glass substrate comprises a glass plate with etched trough-shaped cavities forming side walls and with the substrate side walls aligned with the flanking side walls of the dielectric sheet.

14. The device of claim 13, characterized in that spaced electrodes are provided on the flanking side walls.

15. The device of claim 6, characterized in that the top wall has a thickness between 5 and 50 µm.

16. In a method for making the plasma channel plate of a plasma-addressed electro-optic display device comprising a layer of electro-optic material, data electrodes coupled to the electro-optic layer and adapted to receive data voltages for activating portions of the electro-optic layer, a plurality of elongated plasma channels extending generally transverse to the data electrodes for selectively switching on said electro-optic portions, and a dielectric sheet closing off the plasma channels on the side facing the data electrodes, said plasma channels each comprising spaced elongated cathode and anode plasma electrodes and an ionizable gas filling, said method being characterized in that:

(a) providing a first glass bottom plate, (b) providing a second glass top plate, (c) subjecting the second glass top plate to a plasma etching process to etch therein spaced elongated cavities each forming a thin top wall flanked by substantially vertical side walls with the thin top wall having a substantially flat inner surface, (d) providing spaced electrodes on the first glass plate or on the flanking side walls, (e) disposing the etched second glass plate over the first glass plate with the cavities facing the first glass plate to form plasma channels with spaced electrodes inside each of the plasma channels.

17. The method of claim 16, characterized in that: subjecting the first glass bottom plate to a plasma etching process to etch therein spaced elongated cavities each forming a bottom wall flanked by substantially vertical side walls with the bottom wall having a substantially flat inner surface, disposing the etched second glass plate over the etched first glass plate with the cavities facing one another to form plasma channels with spaced electrodes inside each of the plasma channels.

* * * * *